United States Patent
Cheng et al.

(10) Patent No.: US 8,218,011 B2
(45) Date of Patent: Jul. 10, 2012

(54) OBJECT TRACKING SYSTEM, METHOD AND SMART NODE USING ACTIVE CAMERA HANDOFF

(75) Inventors: Sung-Ping Cheng, Taichung County (TW); Lih-Guong Jang, Hsinchu (TW); Jen-Yau Kuo, Hsinchu (TW); Jen-Hui Chuang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 517 days.

(21) Appl. No.: 12/544,392

(22) Filed: Aug. 20, 2009

(65) Prior Publication Data

US 2010/0157064 A1 Jun. 24, 2010

(30) Foreign Application Priority Data

Dec. 18, 2008 (TW) ................................ 97149522 A

(51) Int. Cl.
  *H04N 7/18* (2006.01)
(52) U.S. Cl. ........................................ 348/159; 348/169
(58) Field of Classification Search .................. 348/159, 348/169, 153
  See application file for complete search history.

(56) References Cited

U.S. PATENT DOCUMENTS

| | | | |
|---|---|---|---|
| 6,359,647 B1 | 3/2002 | Sengupta et al. | |
| 6,437,819 B1 | 8/2002 | Loveland | |
| 6,690,374 B2 * | 2/2004 | Park et al. | 345/427 |
| 6,809,760 B1 | 10/2004 | Takagi et al. | |
| 7,242,423 B2 * | 7/2007 | Lin | 348/169 |
| 7,450,735 B1 * | 11/2008 | Shah et al. | 382/103 |
| 7,636,452 B2 * | 12/2009 | Kamon | 382/103 |
| 7,840,130 B2 * | 11/2010 | Kucharyson | 396/56 |
| 8,054,330 B2 * | 11/2011 | Shu et al. | 348/143 |
| 2004/0257444 A1 * | 12/2004 | Maruya et al. | 348/169 |
| 2005/0104958 A1 | 5/2005 | Egnal et al. | |
| 2006/0126737 A1 * | 6/2006 | Boice et al. | 348/169 |
| 2006/0126738 A1 | 6/2006 | Boice et al. | |
| 2007/0003146 A1 * | 1/2007 | Ko et al. | 382/224 |
| 2007/0035627 A1 * | 2/2007 | Cleary et al. | 348/159 |
| 2009/0046153 A1 * | 2/2009 | Chen et al. | 348/159 |
| 2010/0002082 A1 * | 1/2010 | Buehler et al. | 348/159 |
| 2010/0134627 A1 * | 6/2010 | Yen et al. | 348/159 |

FOREIGN PATENT DOCUMENTS

WO WO 2008100359 A1 * 8/2008

* cited by examiner

*Primary Examiner* — Kevin Bates
(74) *Attorney, Agent, or Firm* — Thomas|Kayden

(57) ABSTRACT

If an active smart node detects that an object leaves a center region of a FOV for a boundary region, the active smart node predicts a possible path of the object. When the object gets out of the FOV, the active smart node predicts the object appears in a FOV of another smart node according to the possible path and a spatial relation between cameras. The active smart node notifies another smart node to become a semi-active smart node which determines an image characteristic similarity between the object and a new object and returns to the active smart node if a condition is satisfied. The active smart node compares the returned characteristic similarity, an object discovery time at the semi-active smart node, and a distance between the active smart node and the semi-active smart node to calculate possibility.

18 Claims, 7 Drawing Sheets

OBJECT TRACKING SYSTEM, METHOD AND SMART NODE USING ACTIVE CAMERA HANDOFF

This application claims the benefit of Taiwan application Serial No. 97149522, filed Dec. 18, 2008, the subject matter of which is incorporated herein by reference.

TECHNICAL FIELD

The application relates in general to an intelligent distributed object tracking system, and more particularly to an intelligent distributed object tracking system using a handoff mechanism to achieve continuous real-time tracking on at least one object.

BACKGROUND

Video surveillance systems have been widely used in various occasions, such as bank surveillance and public surveillance. The video surveillance system can momentarily track an object, such as a character or a vehicle, and thus play a very important role in the vision-based object tracking.

At present, the vision-based object tracking system is broadly divided into four categories. In the first category of vision-based object tracking system, the camera will continuously track the object in a field of view (FOV). However, when the object left the camera FOV and enters into the new FOV of another camera, the system will not be able to automatically track this object, or the system will be treated this object as a new object to continue tracking. The second category of vision-based object tracking system provides inter-camera FOV centralized tracking. However, as for the centralized vision-based object tracking system, it is not possible to reach a real-time tracking. In addition, when the number of tracked objects is increased, or the number of cameras in the system is increased, the system performance will be substantially reduced. The third category of vision-based object tracking system can across the camera FOV to track the object, but is seldom seeing on the market due to some factors. The fourth category of vision-based object tracking system requires additional sensors, such as radio frequency identification (RFID) sensors, to address the problem of re-identifying the object. This problem usually occurs in when the object across the camera FOV. However, such systems are not practical because of the need for additional sensors.

The current vision-based object tracking system does not satisfy the actual needs of the market, this invention provides a new intelligent distributed object tracking system to improve the problem of the current system, especially to improve the utility of the conventional vision-based object tracking system.

In addition, the conventional vision-based object tracking system also provides an event alert detection function. If a moving object triggers the alert condition, the system generates an alert event. However, the system cannot dynamically control whether or not only the objectives of specific to perform the alert detection, although it can obtain data of the specific object by querying the event database later.

Embodiment of the invention provides a distributed video surveillance system based on a handoff mechanism. When at least one object (human or vehicle) is under track, continuous tracking on multiple objects can be simultaneously performed. The video surveillance system according to embodiment of the invention performs multi-object tracking function even if the FOVs of multiple cameras are not overlapped. More particularly, the video surveillance system according to embodiment of the invention performs multi-object tracking function in the indoor/outdoor environment even if cameras are not calibrated in advance.

BRIEF SUMMARY

Provided is an embodiment of an intelligent distributed object tracking system for enhancing object tracking wherein there is always at least one smart node in the system is in charge of tracking the object at any time stamp.

In embodiment of the intelligent distributed object tracking system, when the camera handoff is prompted, smart nodes transmit monitor metadata with each other. This metadata information allow event detection program in advance to know which object is a security object (i.e. which object is the object under tracking), and can reach the precise event detection and warning control.

An exemplary embodiment provides an object tracking method applied in an intelligent distributed object tracking system based on a camera handoff mechanism. The intelligent distributed object tracking system includes at least one control center, a plurality of smart nodes and a plurality of cameras. The smart nodes manage the cameras. The object tracking method includes steps of: (a) detecting, by a first smart node of the smart nodes, a position of an object to judge whether the object leaves a center region of a first FOV of the first smart node for a boundary region when the first smart node is tracking the object; (b) predicting, by the first smart node, a possible path of the object when the object enters into the boundary region of the first FOV of the first smart node; (c) predicting, by the first smart node, that the object will appear in a second FOV of a second smart node of the smart nodes according to the possible path of the object and a spatial relation between the cameras when the object gets out of the first FOV of the first smart node; (d) notifying, by the first smart node, the second smart node to detect a first newly entered object inside the second FOV; (e) determining, by the second smart node, a first image characteristic similarity between the object and the first newly entered object, and returning the first image characteristic similarity to the first smart node; (f) deciding, by the first smart node, whether to make handoff transfer to the second smart node according to the first image characteristic similarity returned by the second smart node; and (g) making handoff transfer, by the first smart node, to the second smart node if yes in (f) so that the second smart node takes over tracking on the object.

Another embodiment provides an intelligent distributed object tracking system using a camera handoff mechanism. The system includes a control center, a plurality of smart nodes communicating with the control center, and a plurality of cameras controlled by the smart nodes. When a first smart node of the smart nodes is tracking an object, the first smart node detects a position of the object to judge whether the object leaves a center region of a first FOV of the first smart node for a boundary region of the first FOV to predict a possible path of the object. When the object to leave the first FOV of the first smart node, the first smart node predicts that the object appears inside a second FOV of a second smart node of the smart nodes according to the possible path of the object and a spatial relation between the cameras. The first smart node notifies the second smart node to detect a first newly entered object inside the second FOV. The second smart node determines a first image characteristic similarity between the object and the first newly entered object, and returns to the first smart node. The first smart node decides whether to make handoff transfer to the second smart node according to the first image characteristic similarity returned by the second smart node, an object discovery time, and a distance between the first and second smart nodes. If the first smart node decides to make handoff transfer to the second smart node, the second smart node takes over tracking on the object.

Still another exemplary embodiment provides a smart node using a camera handoff mechanism, the smart node applied in an intelligent distributed object tracking system for tracking at least one object. The intelligent distributed object tracking system includes a control center and a plurality of cameras. The smart node includes an image processing module, an object tracking module, an alert detection module and a handoff operation control module. The image processing module obtains an image characteristic of the object. The object tracking module coupled to the image processing module is for designating a serial number to the object, receiving an object tracking enabling command, periodically returning to the control center a label information and a position information of the object, and performing FOV boundary detection and image characteristic comparison. The alert detection module coupled to the object tracking module is for enabling a detection function according to a monitor metadata of the object. When an object triggering alert is the object tracked by the smart node, the alert detection module outputs alertness, the alert detection module decides an alert level according to the monitor metadata of the object, and the alert detection module transmits an alert message to the control center. The handoff operation control module, coupled to the alert detection module and the object tracking module, is for making handoff transfer and enabling a dedicated handoff control program for the object. A state of the handoff control program relates to a handoff operation performing condition, and the handoff operation control module transmits the monitor metadata of the object to the alert detection module.

It is to be understood that both the foregoing general description and the following detailed description are exemplary and explanatory only and are not restrictive of the disclosed embodiments, as claimed.

DETAILED DESCRIPTION OF EXEMPLARY EMBODIMENT OF THE INVENTION

An intelligent distributed object tracking system according to exemplary embodiment of the invention uses camera handoff mechanism and can simultaneously and continuously track multiple objects even if the FOVs of cameras are not overlapped.

In the intelligent distributed object tracking system according to the embodiment of the invention, during handoff transfer operation, smart nodes transmit monitor metadata to each other so that the next smart node in charge of tracking knows which objects are alert subjects in advance and the control of event detection and alert can be achieved.

In the intelligent distributed object tracking system according to the embodiment of the invention, during object tracking, no matter what selects for a while, there is a smart node responsible for tracking, in order to enhance the usefulness of tracking.

Figure 1:
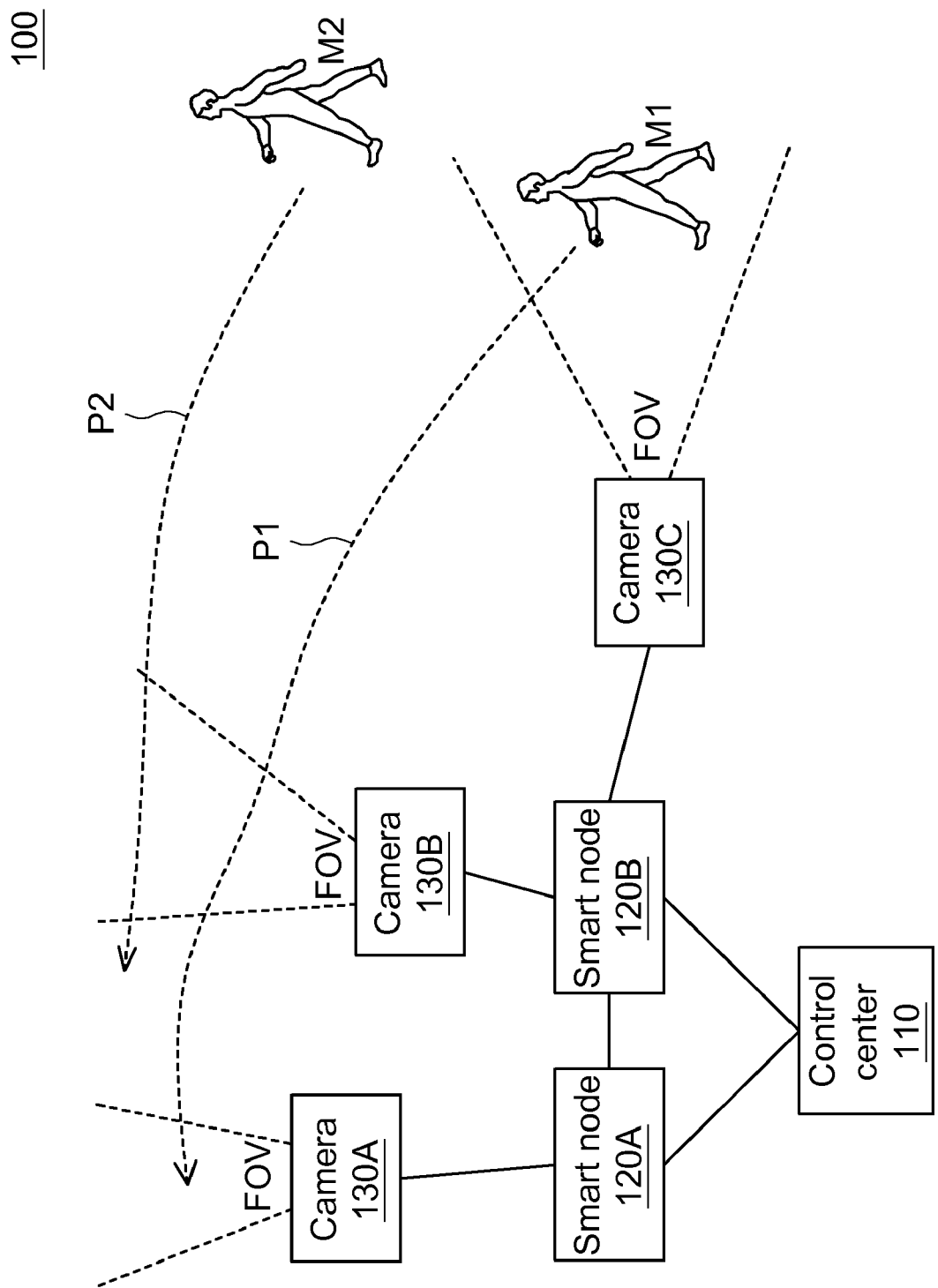
FIG. 1 is a schematic illustration showing an intelligent distributed object tracking system according to an embodiment of the invention.

FIG. 1 is a schematic illustration showing an intelligent distributed object tracking system 100 according to an embodiment of the invention. Referring to FIG. 1, the intelligent distributed object tracking system 100 includes a control center 110, multiple smart nodes 120 and multiple cameras 130. Herein, two smart nodes 120A and 120B and three cameras 130A, 130B and 130C will be illustrated as an example, but the invention is not limited thereto. The intelligent distributed object tracking system 100 may track one or multiple objects. Herein, two objects M1 and M2 will be illustrated as an example, but the invention is not limited thereto. P1 and P2 represent moving paths of the objects M1 and M2 respectively.

The control center 110 is an interface between the system 100 and an operator. The functions of the control center 110 include: designating a track under track and enabling object tracking; and receiving object tracking messages returned by each smart node and displaying the messages on a screen. If an object loss event occurs in the handoff procedure and the object loss retrieving also fails, the control center 110 displays this message so that the operator or the administrator can manually re-designate object under track. The control center 110 also provides an interface so that the operator can set the system. In addition, the control center displays the messages transferred from the smart nodes, and all the smart nodes 120 communicate with the control center 110 via the network.

The smart node 120 is core of the system, and the function thereof will be described in the following. A smart node with enough computing ability and one or multiple panoramic cameras controlled thereby constitute a basic monitor unit. Each monitor unit independently monitors the moving object inside the FOVs of the cameras. The range of image monitoring of the system can be extended when a lot of monitor units are disposed in the system. The smart node may be a personal digital assistant (PDA), a computer or the like. Basically, a smart node having more powerful computing ability can control more cameras, and vice versa. The smart nodes 120 communicate with each other via the network. In the embodiment of the invention, the image signal captured by the camera may be basically processed by the smart node, i.e. the control center does not always process the image signal captured by the camera, and this is one of the definitions of the distribution system.

The camera 130 used in this embodiment pertains to the panoramic camera, which is steady (fixed) and does not support PTZ (pan-tilt-zoom) function. For the sake of simplicity, the FOV of each camera 130 is further labeled in FIG. 1. The FOVs of these cameras 130 may be non-overlapped or partially overlapped to each other. Each camera 130 is controlled by only one smart node, and a smart node can control one or multiple cameras 130.

Taking M1 is the object under tracking as an example. Assume that the object M1 moves along to road of the moving path P1. During M1 object leaving the FOV camera 130B and entering FOV camera 130A, the handoff mechanism is completed. In other words, during this period of time, the tracking control has to be transferred (i.e. handoff) from the smart node 120B to the smart node 120A, so that the track on the object M1 can be continuous.

Figure 2:
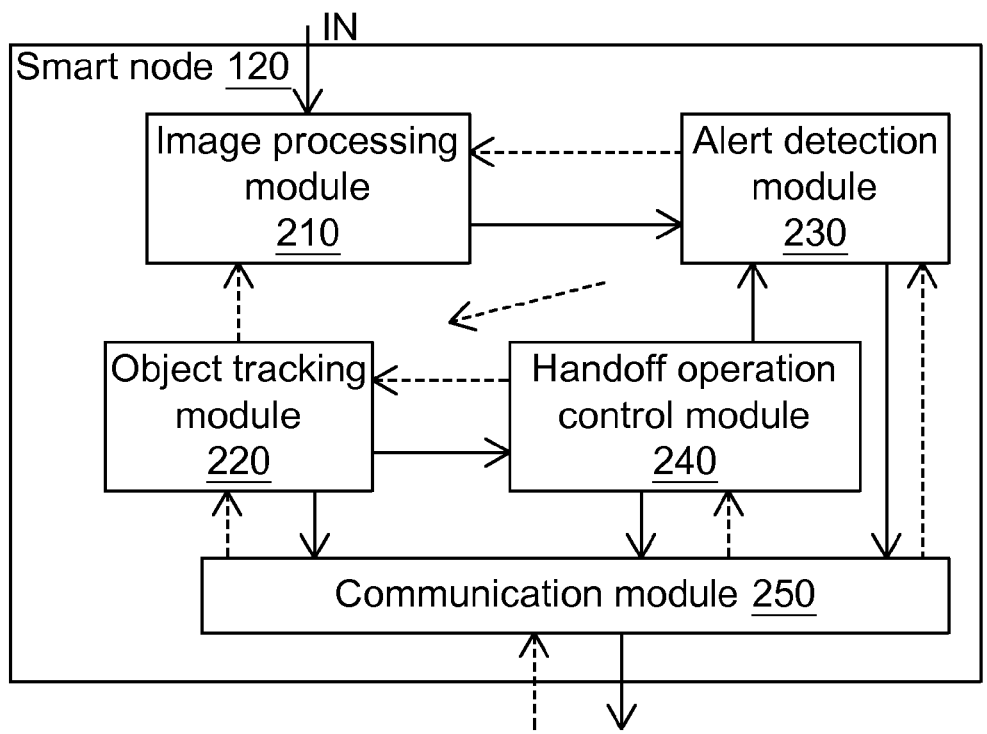
FIG. 2 is a functional block diagram showing a smart node according to the embodiment of the invention.

FIG. 2 is a functional block diagram showing the smart node 120 according to the embodiment of the invention. Referring to FIG. 2, the smart node 120 includes an image processing module 210, an object tracking module 220, an alert detection module 230, a handoff operation control module 240 and a communication module 250. In FIG. 2, the solid line represents the data flow, while the dashed line represents the packet request flow.

The image processing module 210 receives an input image signal IN transferred from the camera 130, and performs image processing. The image processing module 210 can obtain the image characteristics (color, size, position, direction, moving speed, etc.) of the moving object inside the FOV of the camera 130 by way of image processing. The image data processed by the image processing module 210 may be accessed by other modules.

The object tracking module 220 tracks the moving object by way of image tracking. During tracking, the object tracking module 220 designates an unique label or serial number to each moving object; and the object is designated by the same label or serial number inside the same FOV. The object tracking module 220 receives an object track enabling command from the control center 110 or from the alert detection module 230. The object tracking module 220 periodically returns the information (e.g., label, position and the like) of the tracking object to the control center 110. The object tracking module 220 performs FOV boundary detection and image characteristic comparison operation according to the requirement from the handoff operation control module 240.

The alert detection module 230 provides detection functions, including electronic tripwire, region intrusion, abandoned object detection and the like, and can decide to enable one or more of the detection functions according to the monitor metadata of the object under track. When the object which triggers alert is the object tracked by the active smart node 120, the alert detection module 230 outputs the alertness. The alert detection module 230 decides the alert level according to the monitor metadata of the object. The alert detection module 230 may transfer the alert message to the control center 110. The alert detection module 230 can provide a user graphic interface (GUI) so that the operator can set the alert condition. The alert detection module 230 receives the monitor metadata of the object transferred from the handoff operation control module 240.

The handoff operation control module 240 is in charge of handoff operations and the handoff control, and the detailed functions thereof will be described in the following. The handoff operation control module 240 enables each handoff control program for each object under track. That is, if the smart node simultaneously tracks multiple objects, multiple handoff control programs are simultaneously executed, operations of these handoff control programs being independent from each other. States of the handoff control programs relate to the handoff performing conditions during object tracking, and the states thereof will be described in the following. Each handoff control program operates independently. After the handoff transfer is successfully finished, the handoff control program automatically enters into an idle state and waits for next enablement. The handoff operation control module 240 transfers the monitor metadata of the object to the alert detection module 230. Alternatively, the previous active smart node 120 transfers the monitor metadata of the object to the next active smart node 120 during the handoff transfer.

The communication module 250 is in charge of communication between this smart node and other smart nodes 120, and communication between this smart node and the control center 110. Basically, any network communication protocol can be used during communication.

Figure 3:
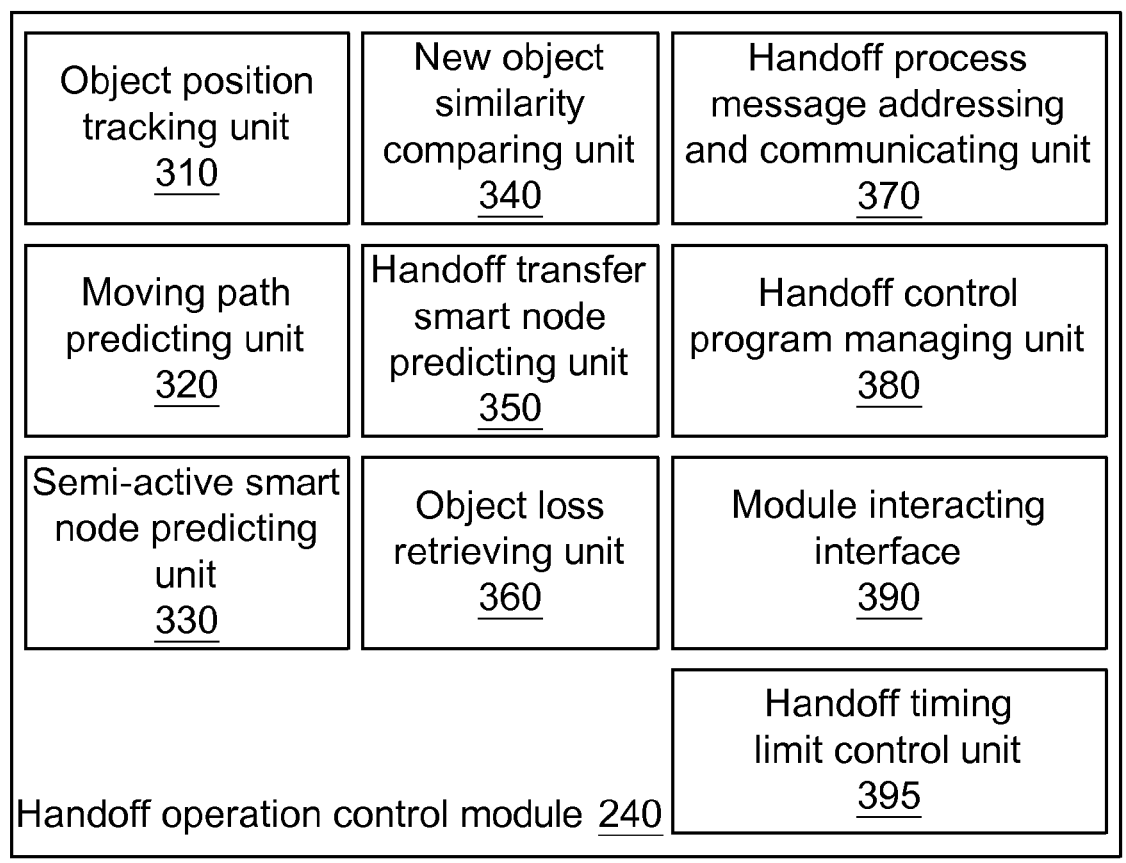
FIG. 3 is a functional block diagram showing a handoff operation control module according to the embodiment of the invention.

FIG. 3 is a functional block diagram showing the handoff operation control module 240 according to the embodiment of the invention. Referring to FIG. 3, the handoff operation control module 240 includes an object position tracking unit 310, a moving path predicting unit 320, a semi-active smart node predicting unit 330, a new object similarity comparing unit 340, a handoff transfer smart node predicting unit 350, an object loss retrieving unit 360, a handoff process message addressing and communicating unit 370, a handoff control program managing unit 380, a module interacting interface 390 and a handoff timing limit control unit 395.

The object position tracking unit 310 judges whether the object is in the center region or the boundary region of the FOV, or out of the FOV according to the object position obtained by image processing.

The moving path predicting unit 320 predicts the future possible path of the object according to the moving path of the object inside the FOV, and judges that the future possible path of the object is covered by the FOVs of which cameras.

The semi-active smart node predicting unit 330 decides which smart nodes in the system becomes the semi-active smart nodes according to the predicted result of the moving path predicting unit 320. The definition of the semi-active node will be described in the following.

The new object similarity comparing unit 340 judges the image characteristic of the object newly entering into the FOV, and determines a similarity between the image characteristic of the new object and the image characteristic of the object under track by way of comparison.

The handoff transfer smart node predicting unit 350, in accordance with the similarity, an object discovery time, and the distance between the smart node of these data, makes probability inference, identifies the highest probability rate of the new object as a real tracking object, and accordingly determines the transfer of the handoff control to a next smart node (that is, to initialize the next smart node).

The object loss retrieving unit 360 processes the object loss retrieving operation, and the details thereof will be described in the following.

The handoff process message addressing and communicating unit 370 encodes the messages appeared in the handoff operation into network packets and decodes received network packets.

The handoff control program managing unit 380 controls each handoff control program in the smart node and the states thereof.

The module interacting interface 390 communicates with other modules in the smart node 120.

The handoff timing limit control unit 395 provides timing limit management and control during the handoff procedure.

Figure 4A:
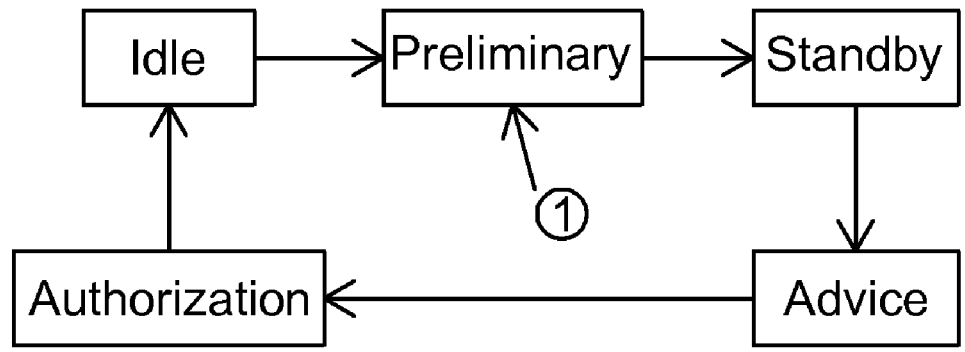
FIG. 4A shows a state diagram of a handoff control program of an active smart node.
Figure 4B:
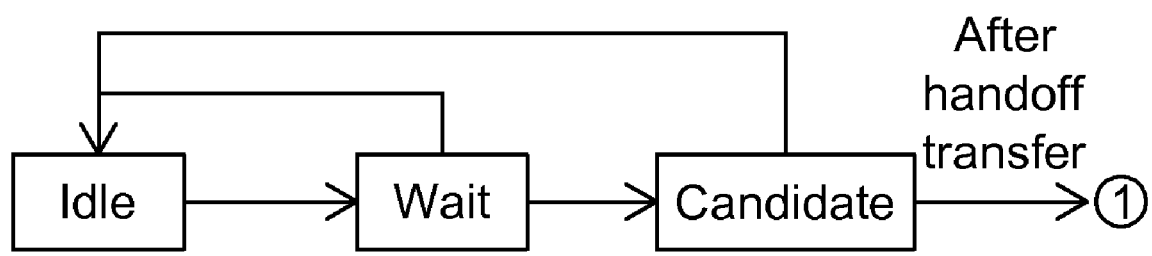
FIG. 4B shows a state diagram of a handoff control program of a semi-active smart node.

FIG. 4A shows a state diagram of a handoff control program of an active smart node. FIG. 4B shows a state diagram of a handoff control program of a semi-active smart node. In here, the active smart node represents the smart node being in charge of object tracking, while the semi-active smart node represents the smart node, which may be in charge of object tracking in future (i.e. after handoff). That is, the semi-active smart node may or may not become the next active smart node.

As shown in FIG. 4A, the handoff control program of the active smart node has many states including an idle state, a preliminary state, a standby state, a advice state and an authorization state. As shown in FIG. 4B, the handoff control program of the semi-active smart node has many states including an idle state, a wait state and a candidate state. These states will be described in the following.

Figure 5:
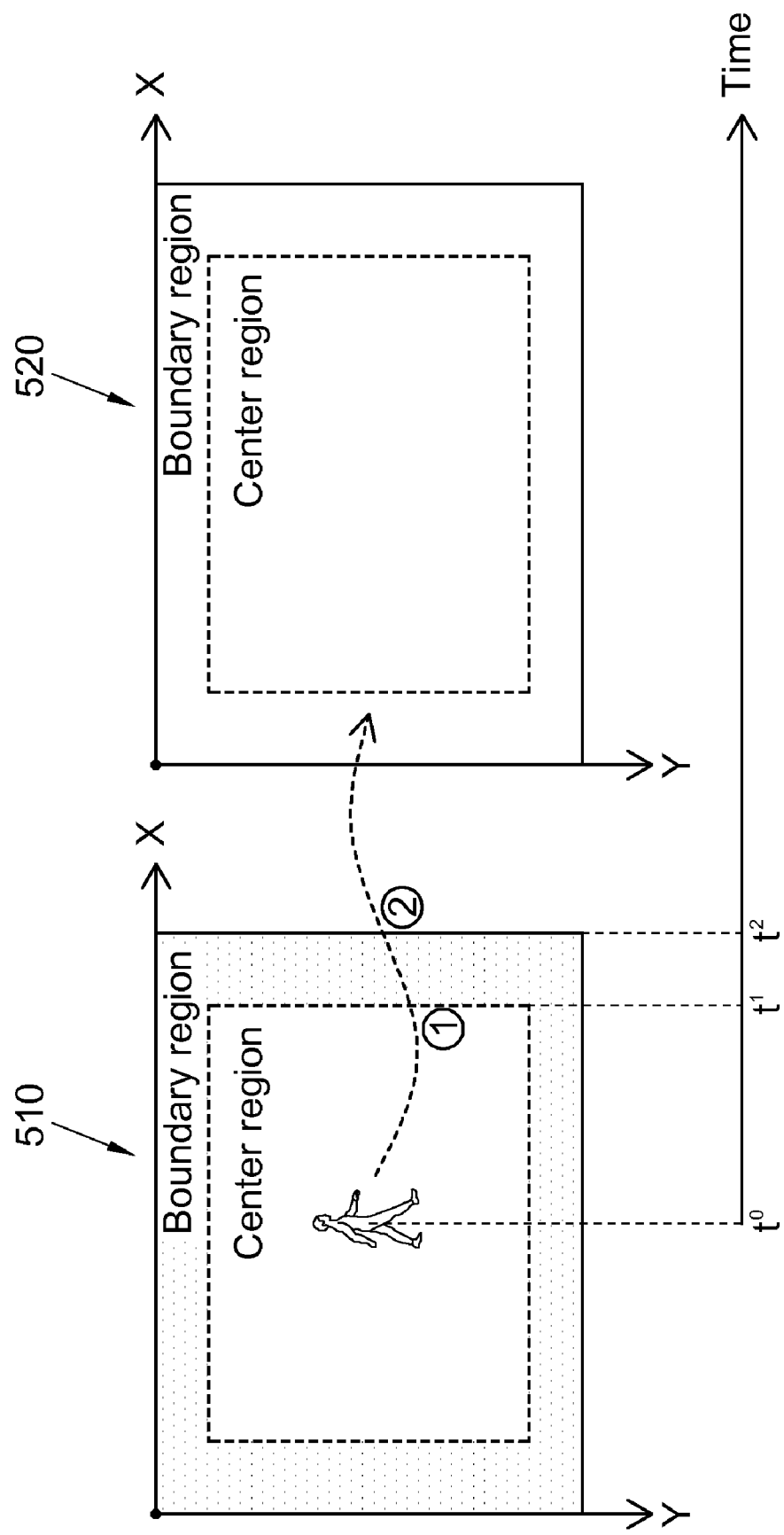
FIG. 5 is a schematic illustration showing a FOV buffer according to the embodiment of the invention.
Figure 6:
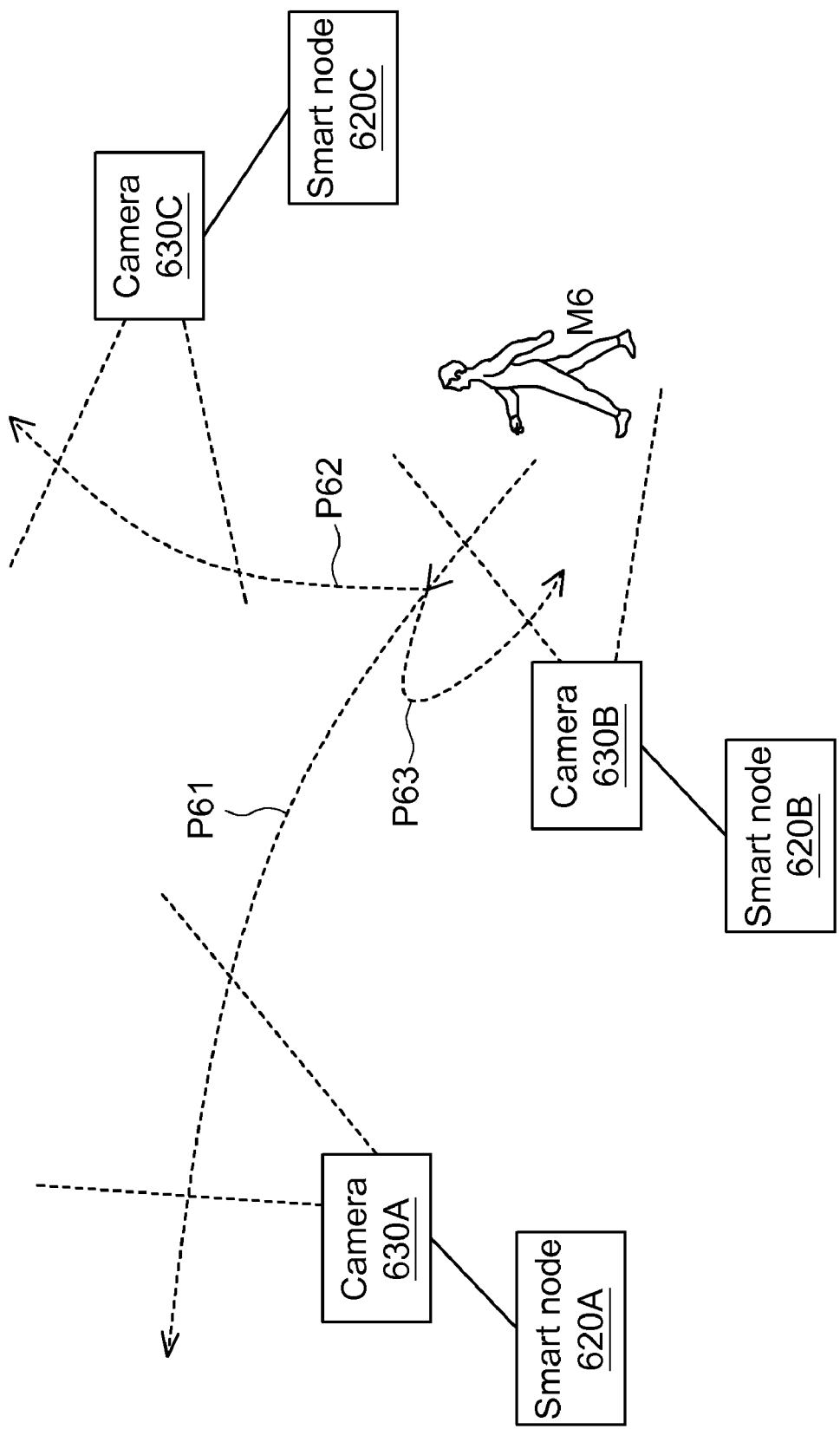
FIG. 6 is a schematic illustration showing prediction of possible paths of the object under track according to the embodiment of the invention.
Figure 7:
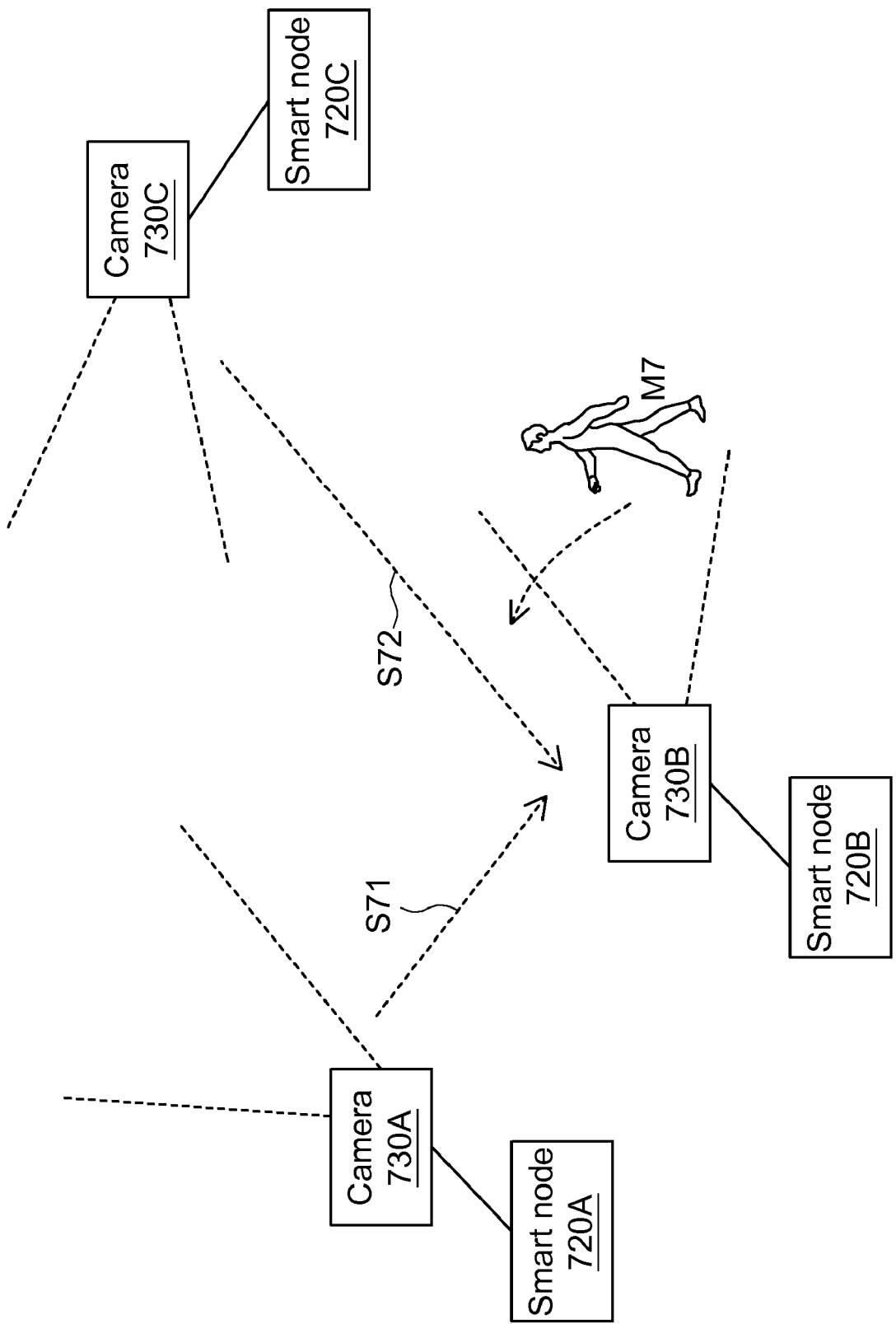
FIG. 7 is a schematic illustration showing decision of a handoff transfer according to the embodiment of the invention.
Figure 8:
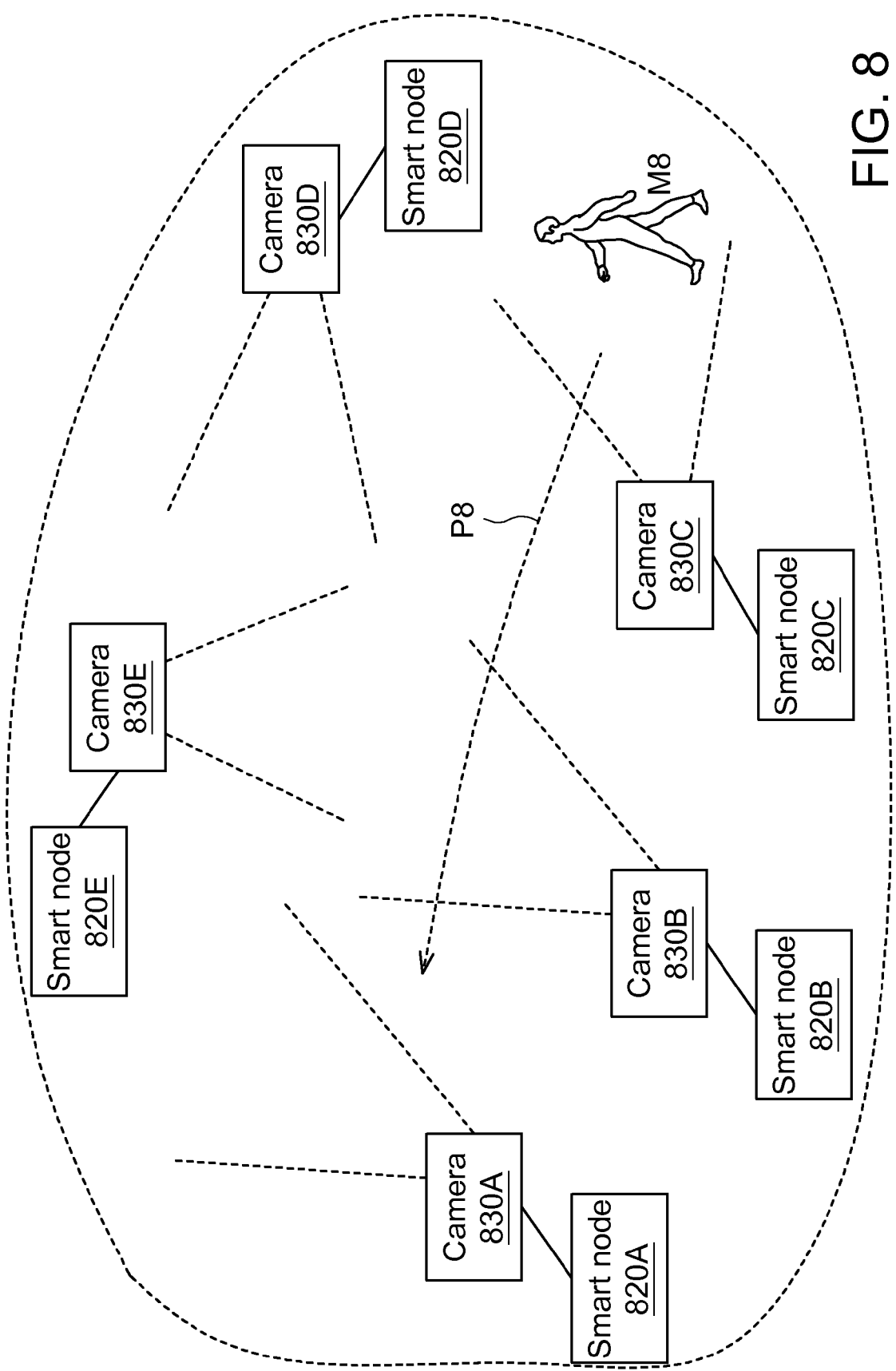
FIG. 8 is a schematic illustration showing object loss retrieving according to the embodiment of the invention.

FIG. 5 is a schematic illustration showing a FOV buffer according to the embodiment of the invention. FIG. 6 is a schematic illustration showing prediction of possible paths of the object under track according to the embodiment of the invention. FIG. 7 is a schematic illustration showing decision of a handoff transfer according to the embodiment of the invention. FIG. 8 is a schematic illustration showing object loss retrieving according to the embodiment of the invention.

The operations of the embodiment of the invention will be described with reference to FIGS. 4A to 8.

Enablement of Tracking Object (Human Or Vehicle)

The tracking operation may be enabled after the operator designates an object on the monitor screen of the control center 110. Alternatively, when a moving object triggers the alert condition set by the alert detection mechanism, the smart node automatically regards this object as an object under track and starts tracking. As shown in FIG. 5, the smart node starts tracking at the time axis of t0.

The smart node in charge of tracking is referred to as the active smart node. Before handoff transfer to the next smart node, the current active smart node is in charge of the tracking of the object, the handoff procedure, and the tracking object loss retrieving process.

The smart node enables a dedicated handoff control program to track this object. At this time, the handoff control program automatically enters into the preliminary state. In the preliminary state, the object position tracking unit 310, the moving path predicting unit 320 and the semi-active smart node predicting unit 330 in the handoff operation control module 240 in the smart node are in the normal operation. That is, the smart node has to track the position of the object, predict the moving path of the object, and predict which smart nodes will become the semi-active smart nodes.

Object Under Track Getting Out of FOV

In the embodiment of the invention, the FOV of the camera is divided into a center region and a boundary region (see FIG. 5). Please note that the symbols 510 and 520 of FIG. 5 respectively represent the projection plane coordinate systems of two FOVs, not actual plane coordinates. The boundary region may serve as a buffer for the handoff process. The settings of the center region and the boundary region may be automatically determined by the software according to the scene or may be manually designated by the operator.

The handoff control program of the active smart node continuously obtains the position of the object under track from the image processing module 210 and the object's moving path to judge whether the object moves toward the boundary region. When the object leaves the center region for the boundary region (see the symbol ① and the time axis of t1 in FIG. 5), the handoff control program enters into the standby state and predicts (calculates) the possible path of the object according to the known moving path of this object.

When the object gets out of the FOV (see the symbol ② and the time axis of t2 in FIG. 5), the handoff control program predicts that the object will appear inside the FOVs of which smart nodes according to the moving path of the object and the spatial relation between each camera. In here, the FOV of the smart node represents the FOVs of all cameras controlled by the smart node.

Next, the handoff control program can immediately or later advise (notify) which smart node to enter into the standby state, and the advised (notified) smart nodes are referred to as the semi-active smart nodes. After the advice (notification), the handoff control program of the active smart node enters into the advice state.

As shown in FIG. 6, the object M6 is inside the FOV of the camera 630B controlled by the smart node 620B, so the smart node 620B is in charge of tracking it at this time. That is, the smart node 620B is the active smart node. When the object M6 gets out of the FOV of the camera 630B, the smart node 620B predicts (calculates) the future possible paths P61 to P63 according to the moving path of the object, wherein the moving paths P61 to P63 may have different possibilities. According to the future possible paths P61 to P63, the smart node 620B predicts or calculates that the object may appear inside the FOVs of which smart nodes according to the FOV of the cameras. In FIG. 6, for example, if the object moves along the moving path P61, the object will appear inside the FOV of the camera 630A of the smart node 620A. If the object moves along the moving path P62, the object will appear inside the FOV of the camera 630C of the smart node 620C. If the object moves along the moving path P63, the object will appear inside the FOV of the camera 630B of the smart node 620B (i.e., the object again returns to the FOV of the camera 630B of the smart node 620B). So, the smart node 620B advises (notifies) the smart nodes 620A to 620C to enter into the standby state and the smart nodes 620A to 620C become the semi-active smart nodes. The handoff control programs of these semi-active smart nodes are set in the wait state.

The advice (notification) between the smart nodes may be transferred in network packets, and the contents of the advice (notification) include the serial number of the object, the serial number of the active smart node, the serial number of the handoff control program, the image characteristic of the object, the predicted appearance time, and the handoff timing limit control parameter.

The advised (notified) semi-active smart nodes (the smart nodes 620A to 620C in FIG. 6) need to enable the dedicated handoff control program(s) for objects that may appear. The handoff control program of the semi-active smart node enters into the wait state. The semi-active smart node starts to detect whether the newly entered object inside its FOV has the similar image characteristic, and compares the image characteristic of the object (obtained via the image processing module 210) with any new object entering the its FOV. Because the image identification may not be 100% precision, if the image characteristic similarity exceeds a threshold value in this system according to this embodiment of the invention, the semi-active smart node is deemed as having successfully detected the object, that is, the comparison succeeds.

Object under track Entering into FOV Of Certain Camera

After the comparison for the semi-active smart nodes is successful, the handoff control program of the semi-active smart node returns the image characteristic similarity to the active smart node and then enters into the candidate state. Sometimes, many semi-active smart nodes may return the message of "comparison successful", so the active smart node needs to decide the handoff transfer subject. If in the timing limit, the semi-active smart node cannot detect the object (i.e. comparison fails), the handoff control program of the semi-active smart node also returns the message, indicating the comparison failure, to the active smart node and then enters into the idle state.

Deciding the Subject of Handoff Transfer

After the active smart node advises (notifies) the semi-active smart node to start to determine the image characteristic similarity, the handoff control program of the active smart node starts to wait the return from each semi-active smart node, that is, the program is in the standby state. After waiting for a period of time (the timing limit is set by the system), the handoff control program of the active smart node manages the image characteristic comparison similarity returned by all the semi-active smart nodes. Thereafter, active smart node's handoff control program bases the similarity, the object discovery time and the distance between the smart node of these data to make probability inference, with the highest probability rate of the new object as a real tracking object, and so to determine the transfer of the handoff control to next smart node.

Taking FIG. 7 as an example, the smart node 720B originally tracks the object M7. When the object M7 moves out of the FOV of the camera 730B, the smart node 720B calculates that the object M7 may appear inside the FOV of the camera 730A controlled by the smart node 720A, or appear inside the FOV of the camera 730C controlled by the smart node 720C. So, the smart node 720B advises (notifies) the smart nodes 720A and 720C to become the semi-active smart nodes. After the advice (notification) is received, the smart nodes 720A and 720C determine the image characteristic of all newly appearing objects inside the FOVs of the cameras thereof, and respectively return the image characteristic similarities S71 and S72 to the active smart node 720B. Next, the smart node 720B calculates which one will become the next active smart node according to the following possibility formula:

$$P(\Psi|x, y, t)$$

wherein $\Psi$ represents the handoff transfer event, "x" represents the image characteristic similarity, "y" represents the distance between the smart nodes and "t" represents the time when the semi-active smart node returns the image characteristic similarity.

In addition, in some scenes (e.g., the possible moving direction of the object is restricted), it is possible to define the handoff subjects in advance, and record the handoff subjects into a lookup table. Thereafter, the active smart node may look up the table to decide the handoff transfer subject.

After the active smart node decides the handoff transfer subject, the handoff control program of the active smart node leaves from the advice state into the authorization state. In addition, the handoff transfer smart node predicting unit in the handoff operation control module of the active smart node operates normally in the advice state. That is, the handoff transfer smart node predicting unit executes the above-mentioned possibility formula to predict or calculate which one will become the next active smart node.

Handoff Transfer

The object of the handoff transfer is to exchange the tracking control on the object, and the tracking control is transferred from the current active smart node to the next active smart node so that the next active smart node will track this object in future. The active smart node advises (notifies) the semi-active smart node which will receive the handoff transfer, wherein the contents of the advice (notification) message include the serial number of the object and the image characteristic of the object. After the semi-active smart node receives the advice (notification), the semi-active smart node may identify that the object is still inside the FOV of the camera under control according to the image characteristic. Alternatively, the semi-active smart node may not perform the identifying operation (which is for identifying whether the object is still inside its FOV), i.e. the identifying operation is optional. Whether to perform this identification operation may be set in the system in advance.

After replying to the active smart node, the semi-active smart node prepares to take the handoff transfer. If the object is not inside the FOV of the semi-active smart node which is assumed to be a next active smart node, the semi-active smart node has to return (reply) that the object does not exist (the object is lost).

After the active smart node receives the return from the semi-active smart node, the active smart node adopts different methods according to the returned content. If the returned contents of the semi-active smart node represent that the semi-active smart node is ready for the handoff transfer, the active smart node outputs the message for handoff transfer. The contents of this message include the serial number of the object, the image characteristic of the object and the monitor metadata of the object. If the returned contents of the semi-active smart node represent that the object does not exist, it represents that the system has lost track on the object, and the handoff process enters into the object loss retrieving operation.

After the handoff control program of the active smart node outputs the message of the handoff transfer, the active smart node automatically enters into the idle state, the duty (control) on tracking this object is completed. The taking over semi-active smart node becomes the next active smart node, the handoff control program of the next active smart node enters into the preliminary state and the handoff procedure is finished.

Object Loss Retrieving Operation

In waiting reply from the semi-active smart node, if the semi-active smart node does not return the image characteristic similarity, or the image characteristic similarity returned by the semi-active smart node is lower than the predetermined threshold value, then the active smart node regards it as the object loss event. Thereafter, the active smart node performs the object loss retrieving operation, and all semi-active smart nodes automatically enter into the idle state.

The object loss retrieving operation is not in the normal handoff procedure and is performed when the tracking on object is loss. The object loss retrieving operation is performed by the current active smart node, which is in charge of tracking this object.

In addition, when the network is off, the object loss event may also appear. At this time, the current active smart node also has to perform the object loss retrieving operation.

The handoff control program of the active smart node enters into the advice state, and then knows its all neighboring smart nodes according to a lookup table built in the system in advance so as to advise (notifies) its neighboring smart nodes to enter into the standby state. In addition, the active smart node can enlarge the advice (notification) range in the object loss retrieving operation. That is, the active smart node advises (notifies) more smart nodes to become the semi-active smart nodes to search for the lost object together.

The active smart node waits for return from the semi-active smart nodes. If the object loss condition still occurs, the active smart node advises (notifies) the control center 110 to request the operator to re-designate the object.

How the object loss retrieving operation is performed according to the embodiment of the invention will be described with reference to FIG. 8. It is assumed that the smart node 820C is in charge of tracking the object M8. When the object M8 gets out of the FOV of the camera 830C controlled by the smart node 820C, the smart node 820C predicts the possible path of the object M8 as P8, so the smart node 820C advises (notifies) the smart node 820A to become the semi-active smart node. However, the object loss event occurs thereafter. So, the smart node 820C advises (notifies) all the neighboring smart nodes 820A, 820B, 820D and 820E and itself (820C) to become the semi-active smart nodes (i.e., from the idle state into the wait state) and thus to search whether the object appears inside the FOVs of the cameras 830A, 830B, 830D, 830E and 830C controlled thereby. Thereafter, the active smart node 820C decides to perform the handoff transfer or to advise (notify) the control center 110 to re-designate the object according to whether the object M8 is identified.

Transfer of Monitor metadata

In addition, when the handoff transfer is performed in the embodiment of the invention, the current active smart node transfers the monitor metadata of the object to the next active smart node. The alert detection may be performed by the active smart node according to the monitor metadata transferred from the previous active smart node. For example, the alert detection function of the smart node is in disablement until the smart node becomes the active smart node taking over an object. Alternatively, when the object triggering alert is the object under tracking, the active smart node outputs the alert advice (notification), or decides the alert level according to the threat level in the monitor metadata.

The monitor metadata includes the threat level and a handoff timing limit. The threat level represents the threat level of this object, which ranges from 0 to 3. The threat level 0 represents that the object does not cause threat, and the alert detection function needs not to be enabled. The threat level 1 represents that the object has the low-level threat; the threat level 2 represents that the object has the middle-level threat; and the threat level 3 represents that the object has the high-level threat. When the threat level ranges from 1 to 3, the alert detection function is enabled. The threat level may be designated when the tracking starts. In addition, the active smart node can dynamically adjust the threat level according to the behavior of the object during the tracking procedure.

The handoff timing limit of the monitor metadata represents the timing limit during which the active smart node waits for the return from the semi-active smart node, wherein the predetermined value (0) represents the system default value. When the tracking starts, the handoff timing limit may be set to different values. More particularly, different objects may be designated with different handoff timing limits. The monitor metadata may be provided to the alert detection module of the active smart node and thus be used in the advanced control.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A object tracking method using a camera handoff mechanism, the object tracking method applied in an intelligent distributed object tracking system comprising a control center, a plurality of smart nodes and a plurality of cameras, the smart nodes managing the cameras, the object tracking method comprising steps of:

detecting, by a first smart node of the smart nodes, a position of a object to judge whether the object leaves a center region of a first field of view (FOV) of the first smart node for a boundary region when the first smart node is tracking the object; predicting, by the first smart node, a possible path of the object when the object enters the boundary region of the first FOV of the first smart node; predicting, by the first smart node, that the object will appear in a second FOV of a second smart node of the smart nodes according to the possible path of the object and a spatial relation between the cameras when the object gets out of the first FOV of the first smart node; notifying, by the first smart node, the second smart node to detect a first newly entered object inside the second FOV; determining, by the second smart node, a first image characteristic similarity between the object and the first newly entered object, and returning the first image characteristic similarity to the first smart node; deciding, by the first smart node, whether to make handoff transfer to the second smart node according to the first image characteristic similarity returned by the second smart node; and if yes, making handoff transfer, by the first smart node, to the second smart node so that the second smart node takes over tracking on the object.

2. The object tracking method according to claim 1, wherein the image characteristic similarity comprises at least one of a size, a moving speed, a moving direction, a moving track, a color characteristic of the object.

3. The object tracking method according to claim 1, wherein the step of predicting, by the first smart node, that the object will appear in the second FOV of the second smart node of the smart nodes according to the possible path of the object and the spatial relation between the cameras when the object gets out of the first FOV of the first smart node comprises: judging by the first smart node, whether the possible path of the object is covered by the second FOV of the second smart node to predict whether the object appears in the second FOV of the second smart node.

4. The object tracking method according to claim 1, wherein in the step of notifying by the first smart node, the second smart node to detect a first newly entered object inside the second FOV, the first smart node notifies to the second smart node contents comprising: a serial number of the object, a serial number of the first smart node, a serial number of a handoff control program of the first smart node, an image characteristic of the object, a predicted appearance time of the object, and a handoff timing limit control parameter.

5. The object tracking method according to claim 1, wherein the step of deciding, by the first smart node, whether to make handoff transfer to the second smart node according to the first image characteristic similarity returned by the second smart node comprises: judging, by the first smart node, that the second smart node has successfully tracked the object if the first image characteristic similarity returned by the second smart node is higher than a threshold value; and judging, by the first smart node, that the second smart node has not yet tracked the object, and executing an object loss retrieving operation by the first smart node if the first image characteristic similarity returned by the second smart node is lower than the threshold value.

6. The object tracking method according to claim 5, wherein the step of executing, by the first smart node, the object loss retrieving operation comprises:

notifying, by the first smart node, at least one third smart node of the smart nodes to detect a second newly entered object inside a third FOV thereof; determining, by the third smart node, a second image characteristic similarity between the object and the second newly entered object, and returning the second image characteristic similarity to the first smart node; judging, by the first smart node, that the third smart node has successfully tracked the object if the second image characteristic similarity returned by the third smart node is higher than the threshold value, and notifying, by the first smart node, the third smart node for handoff transfer; and judging, by the first smart node, that the third smart node has not yet tracked the object if the second image characteristic similarity returned by the third smart node is lower than the threshold value, and notifying, by the first smart node, the control center to re-designate a track on the object.

7. The object tracking method according to claim 1, wherein deciding, by the first smart node, whether to make handoff transfer to the second smart node comprises: deciding, by the first smart node, according to the first image of the characteristics of similarity, an object discovery time, and the distance between first smart node and second smart node returned from the second smart node, whether or not to handoff to the second smart node; or deciding, by the first smart node, whether to make handoff transfer to the second smart node according to a lookup table.

8. The object tracking method according to claim 1, wherein the step of making handoff transfer, by the first smart node, to the second smart node so that the second smart node takes over tracking on the object further comprises: transmitting, by the first smart node, to the second smart node messages comprise a serial number of the object, an image characteristic of the object and a monitor metadata of the object, when the first smart node makes handoff transfer to the second smart node.

9. The object tracking method according to claim 8, wherein the monitor metadata of the object comprises at least one of a threat level and a handoff timing limit parameter.

10. The object tracking method according to claim 1, wherein when the first smart node makes handoff transfer to the second smart node: the second smart node again judges whether the object is still inside the second FOV; if the second smart node judges that the object is still inside the second FOV, the second smart node replies to the first smart node to make handoff transfer; and if the second smart node judges that the object is not inside the second FOV, the second smart node replies to the first smart node and the first smart node performs a object loss retrieving operation.

11. An intelligent distributed object tracking system using a camera handoff mechanism, the system comprising: a control center; a plurality of smart nodes communicating with the control center; and a plurality of cameras controlled by the smart nodes, wherein: when a first smart node of the smart nodes is tracking an object, the first smart node detects a position of the object to judge whether the object leaves a center region of a first FOV of the first smart node for a boundary region of the first FOV to predict a possible path of the object; when the object gets out of the first FOV of the first smart node, the first smart node predicts that the object appears inside a second FOV of a second smart node of the smart nodes according to the possible path of the object and a spatial relation between the cameras; the first smart node notifies the second smart node to detect a first newly entered object inside the second FOV; the second smart node determines a first image characteristic similarity between the object and the first newly entered object, and returns to the first smart node; the first smart node decides whether to make handoff transfer to the second smart node according to the first image characteristic similarity, an object discovery time and the distance between the smart node of these data returned by the second smart node; and if the first smart node decides to make handoff transfer to the second smart node, the second smart node takes over tracking on the object.

12. The system according to claim 11, wherein the first smart node predicts the possible path of the object when the object enters into the boundary region of the first FOV of the first smart node.

13. The system according to claim 11, wherein each of the smart nodes comprises: an image processing module for obtaining an image characteristic of the object; an object tracking module, coupled to the image processing module, for designating a serial number to the object, receiving an object tracking enablement command from the control center, periodically returning a label information and a position information of the object under track to the control center, and performing FOV boundary detection and image characteristic comparison; an alert detection module, coupled to the object tracking module, for enabling a detection function according to a monitor metadata of the object, wherein when an object triggering alert is the object tracked by the first smart node, the alert detection module outputs alertness, the alert detection module decides an alert level according to the monitor metadata of the object, and the alert detection module transmits an alert message to the control center; and a handoff operation control module, coupled to the alert detection module and the object tracking module, for making handoff transfer and enabling a dedicated handoff control program for the object, wherein a state of the handoff control program relates to a handoff operation performance condition, and the handoff operation control module transmits the monitor metadata of the object to the alert detection module.

14. The system according to claim 13, wherein the handoff operation control module comprises: an object position tracking unit for judging whether the object is inside a center region of a FOV or inside a boundary region of the FOV or whether the object is outside the FOV according to an object position obtained by the image processing module; a moving path predicting unit for calculating the possible path of the object according to movement of the object inside the FOV and judging that the possible path of the object is covered by the second FOV of the second smart node; a semi-active smart node prediction unit for deciding to notify the second smart node to prepare for a handoff transfer according to a predicted result of the moving path predicting unit; a new object similarity comparing unit for generating an image characteristic similarity; a handoff transfer smart node predicting unit for predicting that the first smart node makes handoff transfer to the second smart node according to the image characteristic similarity, an object discovery time and the distance between the smart node; an object loss retrieving unit for performing an object loss retrieving operation; a handoff process message addressing and communicating unit for encoding and decoding a message appeared in a handoff operation; a handoff control program managing unit for controlling each handoff control program in the smart node and a state thereof; a module interacting interface communicating with other modules in the smart node; and a handoff timing limit control unit for providing timing limit management and control for handoff.

15. The system according to claim 14, wherein when the object loss retrieving operation is performed, the first smart node further notifies at least one third smart node of the smart nodes to detect a second newly entered object inside its third FOV; the third smart node determines a second image characteristic similarity between the object and the second newly entered object and returns to the first smart node; if the second image characteristic similarity returned by the third smart node is higher than a threshold value, the first smart node judges that the third smart node has successfully tracked the object, and the first smart node notifies the third smart node to prepare for handoff transfer; and if the second image characteristic similarity returned by the third smart node is lower than the threshold value, the first smart node judges that the third smart node has not yet tracked the object, and the first smart node notifies the control center to re-designate tracking on the object.

16. The system according to claim 11, wherein when the first smart node makes handoff transfer to the second smart node, the first smart node transmits to the second smart node messages comprising a serial number of the object, an image characteristic of the object and a monitor metadata of the object.

17. The system according to claim 16, wherein the monitor metadata of the object comprises at least one of a threat level and a handoff timing limit parameter.

18. The system according to claim 11, wherein when the first smart node makes handoff transfer to the second smart node: the second smart node again judges whether the object is still inside the second FOV; if the second smart node judges that the object is still inside the second FOV, the second smart node returns to the first smart node for handoff transfer; and if the second smart node judges that the object is not inside the second FOV, the second smart node returns to the first smart node, and the first smart node performs an object loss retrieving operation.

* * * * *